United States Patent [19]

Kikuchi

[11] Patent Number: 4,523,817

[45] Date of Patent: Jun. 18, 1985

[54] LENS SYSTEM FOR OPTICALLY RECORDED DISKS

[75] Inventor: Juro Kikuchi, Hachiooji, Japan

[73] Assignee: Olympus Optical Co., Ltd., Tokyo, Japan

[21] Appl. No.: 440,860

[22] Filed: Nov. 12, 1982

[30] Foreign Application Priority Data

Nov. 18, 1981 [JP] Japan .................. 56-183742

[51] Int. Cl.³ .................. G02B 9/60; G02B 21/02
[52] U.S. Cl. .................. 350/465; 350/414
[58] Field of Search .................. 350/465, 469, 414

[56] References Cited

U.S. PATENT DOCUMENTS

| | | | |
|---|---|---|---|
| 4,046,460 | 9/1977 | Koizumi | 350/414 X |
| 4,065,205 | 12/1977 | Fleischman | 350/465 |
| 4,073,575 | 2/1978 | Koizumi | 350/414 X |
| 4,206,977 | 6/1980 | Goto | 350/414 |
| 4,256,374 | 3/1981 | Mickleson | 350/414 |
| 4,257,679 | 3/1981 | Okawa | 350/414 |
| 4,332,442 | 6/1982 | Ookawa | 350/414 X |

FOREIGN PATENT DOCUMENTS 54-43725 4/1979 Japan.
54-127339 10/1979 Japan.
55-26545 2/1980 Japan.

Primary Examiner—John K. Corbin
Assistant Examiner—Scott J. Sugarman
Attorney, Agent, or Firm—Cushman, Darby & Cushman

[57] ABSTRACT

A lens system for optically recorded disks comprising a first, second, third and fourth lens components in the order from the light-source side, the first lens component having positive refractive power, the second lens component having negative refractive power, the third lens component having positive refractive power, the fourth lens component having positive refractive power, the lens system for optically recorded disks having a large N.A., long working distance and wide field angle.

10 Claims, 8 Drawing Figures

LENS SYSTEM FOR OPTICALLY RECORDED DISKS

BACKGROUND OF THE INVENTION

1. Field of the Invention

The present invention relates to a lens system for optically recorded disks.

2. Description of the Prior Art

With a lens system for optically recorded disks, the spot of light formed through it should exist on the track, which is formed by pits representing the signals recorded on the disk, always during operation and, moreover, the spot of light should be always kept in the best condition. On the other hand, the disk is rotated at high speed and generally causes vertical vibration, horizontal vibration, irregular rotation, etc.

As one of methods for making the spot follow up these high speed movements, there is such method that the lens system for optically recorded disks is moved upward and downward for the purpose of focusing by following up the vertical vibration of the disk and the light is vibrated by vibrating a galvanomirror or the like in order to follow up the movements at a right angle to the rotational direction of the disk such as horizontal vibration of the disk.

For the lens system for optically recorded disks to be used in the above-mentioned method to vibrate a galvanomirror, aberrations of the lens system should be favourably corrected to a certain field angle unlike the case of the method in which the lens systme for optically recorded disks is vibrated in order to follow up the movements.

Besides, the lens system for optically recorded disks should have a long working distance so that the lens system for optically recorded disks will not collide against the disk to cause damage when misoperation occurs.

Furthermore, to as far as possible reduce the loss in intensity of light to be caused by the lens system for optically recorded disks, the number of lenses constituting the lens system for optically recorded disks should be made as small as possible. Besides, surfaces of lenses which are in contact with air should be provided with anti-reflection coatings which have transmission factor increasing effect over the range of wavelengths of light to be used.

In these days, players for optically recorded disks are being put to practical use. Therefore, for lens systems for optically recorded disks, it is now important to fulfill the above-mentioned requirements and, especially, to make the working distance long.

When actually assembling the lens system for optically recorded disks into player for optically recorded disks, the lens system may be sometimes mounted in inclined state due to the error in mounting accuracy or the like. Therefore, in these days when the lens system for optically recorded disks are being put to practical use, the lens system for optically recorded disks should have a sufficiently large field angle.

Moreover, the semiconductor laser which produces oscillated light with long wavelength is also being put to practical use in these days. Therefore, compared with those days when He-Ne laser was used, a lens system for optically recorded disks with still larger N.A. is required at present.

Furthermore, for practical use, it is desirable that the price of the lens system is low.

As it is necessary to fulfill many requirements as described in the above, the lens system for optically recorded disks should have a small outer diameter, large N.A., wide field angle, long working distance, and favourably corrected chromatic aberration over the range of wavelengths of light to be used.

However, among known lens systems for optically recorded disks, there is almost no lens system which fulfills all of the above-mentioned requirements. For example, in case of the lens system disclosed in Japanese published unexamined Patent Application No. 127339/79, the number of lenses consituting the lens system is small, i.e., four lenses. However, working distance is short, N.A. is small and field angle is narrow. The lens system disclosed in Japanese published unexamined Patent Application No. 26545/80 comprises four lenses and has a long working distance. However, its N.A. is small and field angle is narrow. In case of the lens system disclosed in Japanese published unexamined Patent Application No. 134815/80, it is attempted to eliminate chromatic aberration by adopting four-component five-element lens configuration. However, chromatic aberration is not eliminated satisfactorily. Moreover, its working distance is short, N.A. is small and field angle is narrow.

SUMMARY OF THE INVENTION

It is, therefore, a primary object of the present invention to provide a lens system for optically recorded disks having a large N.A., long working distance and wide field angle.

The lens system for optically recorded disks according to the present invention has lens configuration as shown in FIG. 2 or FIG. 3 and comprises a first, second, third and fourth lens components I, II, III and IV in the order from the light-source side wherein the first lens component I has positive refractive power, the second lens component II has negative refractive power, the third lens component III has positive refractive power, and the fourth lens component IV has concave surface arranged on the disk side and has positive refractive power, the lens system for optically recorded disks being further arranged to fulfill the conditions (1) through (5) shown below:

$$0 < r_1 < |r_2| \quad (1)$$

$$r_3 < 0, \ |r_3| < |r_4| \quad (2)$$

$$f_1/f > 0 \quad (3)$$

$$f_{12}/f < 0 \quad (4)$$

$$0.6 < f_{34}/f < 1 \quad (5)$$

wherein reference symbols $r_1$ and $r_2$ respectively represent radii of curvature of the surface on the light-source side and surface on the disk side of the first lens component I, reference symbols $r_3$ and $r_4$ respectively represent radii of curvature of the surface on the light-source side and surface on the image side of the second lens component II, reference symbol $f$ represents the focal length of the lens system as a whole, reference symbol $f_1$ represents the focal length of the first lens component I, reference symbol $f_{12}$ represents the total focal length of the first lens component I and second lens component II, and reference symbol $f_{34}$ represents the total focal length of the third lens component III and fourth lens component IV.

To attain one of objects of the present invention, i.e., to obtain a lens system of which the working distance is long compared with the focal length, it is preferable to arrange the lens system as a retrofocus type lens system. When, however, the first lens component is arranged to have negative refractive power, the diameter of the pencil of rays becomes large and, consequently, the lens system as a whole becomes large. Therefore, in the present invention, the first lens component I is arranged to have positive refractive power as shown in FIG. 1 so that the height of ray is thereby reduced. Besides, the second lens component II is arranged to have negative refractive power so that the total refractive power of the first and second lens components becomes negative power.

The third lens component III is arranged to have strong positive refractive power so that the pencil of rays, which is diverged by the first and second lens components, will be converged before becoming so large in diameter.

The fourth lens component IV is arranged as an aplanatic lens component having positive refractive power in order to further increase the N.A. of the pencil of rays which is converged in turn by the first, second, third and fourth lens components in the state that aberrations are corrected adequately.

Due to the above-mentioned reasons, the lens system for optically recorded disks according to the present invention is arranged to have the basic composition of lenses as shown in FIG. 1.

Furthermore, in the present invention, a lens system which enables to attain the object of the present invention is materialized by arranging that the lens system having the above-mentioned basic composition fulfills the afore-mentioned respective conditions.

Now, the afore-mentioned respective conditions are explained below.

To favourably correct aberrations of the lens system as a whole, i.e., aberrations of the first through fourth lens components, aberrations caused by individual lens components should be made as small as possible. For this purpose, it is necessary to arrange that incident angles of rays, which are incident on respective lens surfaces, do not become so large. Respective conditions are established by taking this point into consideration.

The condition (1) is established in order to make aberrations to be caused by the first lens component I small by taking the above-mentioned point into consideration.

If the radius of curvature of the surface on the light-source side of the first lens component I becomes negative ($r_1 < 0$), in case of a lens system having the basic composition of lenses as shown in FIG. 1, the other surface of the first lens component I should be arranged as a surface having large power and, consequently, aberrations become unfavourable. Besides, when the radius of curvature $r_2$ of the surface on the disk side of the first lens component I is $r_2 < 0$ and the relation between $r_1$ and $r_2$ is $r_1 > |r_2|$, the shape of the first lens component I becomes close to a plano-convex lens. As a result, the arrangement of the first lens component I becomes similar to such case that a plano-convex lens is arranged so that the planer surface thereof comes on the object point side when parallel rays are converged by a plano-convex lens and, consequently, aberrations to be caused by the first lens component increase. Besides, when $r_2 > 0$ and $r_1 > r_2$, the diverging power of the surface on the disk side of the first lens component (surface $r_2$) becomes very large. As a result, the other surface of the first lens component should be arranged to have large positive power and, therefore, aberrations become unfavourable.

The condition (2) is established in order to make the ray enter the third lens component III at a high position with a small incident angle.

The reason why it is arranged to diverge the pencil of rays by means of combination of the first and second lens components is to make the ray enter the third lens component III at a high position and to thereby make the working distance long. On the other hand, to reduce aberrations to be caused by the entrance surface of the third lens component III, the angle between the entrance surface of the third lens component and ray incident on that surface should be made small. To fulfill these requirements, it is necessary to arrange a surface with strong diverging power in a position of long distance from the third lens component so that the ray arrives at a high position of the third lens component in the state that the incident angle is small. The condition (2) is established in order to attain this purpose.

If the condition (2) is not fulfilled, the surface with strong diverging power of the second lens component comes to a position near the third lens component. Therefore, to make the ray enter the third lens component at the position of the same height on the front surface of the third lens component as the case that the condition (2) is fulfilled, it is necessary to diverge the rays at a large angle or to make the distance between the second and third lens components large. If, however, the rays are diverged at a large angle, both of negative power of the second lens component and positive power of the third lens component become strong and it becomes impossible to correct aberrations favourably. If, on the other hand, the distance between the second and third lens components is made large, the overall length of the lens system becomes long.

The conditions (3) and (4) are necessary for attaining the basic composition as shown in FIG. 1. As these conditoins are established, it is possible to obtain a compact and light-weight lens system with a long working distance. If the condition (3) is not fulfilled, the lens system becomes large in diameter and it becomes impossible to obtain a compact and light-weight lens system. If the condition (4) is not fulfilled, the working distance cannot be made satistactorily long.

Besides, when the conditions (3) and (4) are fulfilled, the ray passing through the lens system comes to high positions in lens components having positive powers and to a low position in the lens component having negative refractive power. Therefore, it becomes easy to correct spherical aberration as it is known concerning fundamental triplet-type lens systems.

When the condition (4) is fulfilled, the total focal length $f_{34}$ of the third and forth lens components should fulfill the relation of $f_{34}/f < 1$. This is defined by the upper limit of the condition (5). When $f_{34}/f$ becomes small, it is possible to make the working distance of the lens system long. If, however, $f_{34}/f$ is made too small and it becomes $f_{34}/f < 0.6$, powers of the third and fourth lens components become strong and it becomes necessary to increase the number of lenses constituting the lens system or to use special glass materials. As a result, it becomes impossible to provide a compact and light-weight lens system at a low price.

DETAILED DESCRIPTION OF THE PREFERRED EMBODIMENTS

Figure 1:
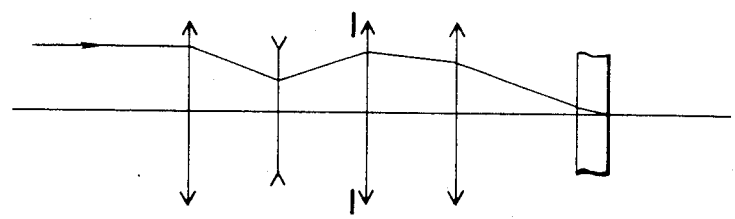
FIG. 1 shows the basic composition of the lens system for optically recorded disks according to the present invention.
Figure 2:
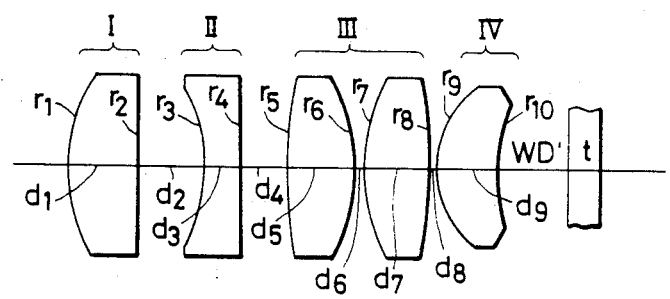
FIG. 2 shows a sectional view of Embodiments 1 through 4 of the present invention.

Now, preferred embodiments of the lens system for optically recorded disks according to the present invention are shown below.

Embodiment 1

$r_1 = 2.1555$
$d_1 = 0.3066 \quad n_1 = 1.58144 \quad \nu_1 = 40.75$
$r_2 = \infty$
$d = 0.1089$
$r_3 = -1.3455$
$d_3 = 0.3377 \quad n_2 = 1.78472 \quad \nu_2 = 25.68$
$r_4 = \infty$
$d_4 = 0.3844$
$r_5 = -17.5732$
$d_5 = 0.3733 \quad n_3 = 1.58144 \quad \nu_3 = 40.75$
$r_6 = -1.6925$
$d_6 = 0.1089$
$r_7 = 2.3819$
$d_7 = 0.3244 \quad n_4 = 1.78472 \quad \nu_4 = 25.68$
$r_8 = -13.8125$
$d_8 = 0.0222$
$r_9 = 0.9058$
$d_9 = 0.3266 \quad n_5 = 1.78472 \quad \nu_5 = 25.68$
$r_{10} = 1.5441$
$f = 1 \quad \Sigma_d = 2.293 \quad t = 0.2666 \quad n_t = 1.51633$
$f_1/f = 3.767 \quad f_{12}/f = -3.878$
$f_{34}/f = 0.916 \quad WD' = 0.776 \quad NA = 0.45$

Embodiment 2

$r_1 = 2.3949$
$d_1 = 0.3067 \quad n_1 = 1.58144 \quad \nu_1 = 40.75$
$r_2 = \infty$
$d_2 = 0.1089$
$r_3 = -1.1944$
$d_3 = 0.3378 \quad n_2 = 1.78472 \quad \nu_2 = 25.68$
$r_4 = \infty$
$d_4 = 0.3844$
$r_5 = -25.3218$
$d_5 = 0.3733 \quad n_3 = 1.78472 \quad \nu_3 = 25.68$
$r_6 = -1.7840$
$d_6 = 0.1089$
$r_7 = 2.5657$
$d_7 = 0.3244 \quad n_4 = 1.78472 \quad \nu_4 = 25.68$
$r_8 = -17.9823$
$d_8 = 0.0222$
$r_9 = 0.9433$
$d_9 = 0.3267 \quad n_5 = 1.78472 \quad \nu_5 = 25.68$
$r_{10} = 1.4895$
$f = 1 \quad \Sigma_d = 2.2933 \quad t = 0.2667 \quad n_t = 1.51633$
$f_1/f = 4.186 \quad f_{12}/f = -2.811$
$f_{34}/f = 0.908 \quad WD' = 0.834 \quad NA = 0.45$

Embodiment 3

$r_1 = 2.6286$
$d_1 = 0.3458 \quad n_1 = 1.78472 \quad \nu_1 = 25.68$

-continued $r_2 = 20.7836$
$d_2 = 0.3834$
$r_3 = -1.4538$
$d_3 = 0.3811 \quad n_2 = 1.69895 \quad \nu_2 = 30.12$
$r_4 = \infty$
$d_4 = 0.3952$
$r_5 = 21.095$
$d_5 = 0.3811 \quad n_3 = 1.78472 \quad \nu_3 = 25.68$
$r_6 = -3.227$
$d_6 = 0.1153$
$r_7 = 4.1541$
$d_7 = 0.3482 \quad n_4 = 1.78472 \quad \nu_4 = 25.68$
$r_8 = -4.3971$
$d_8 = 0.0235$
$r_9 = 0.7652$
$d_9 = 0.3529 \quad n_5 = 1.78472 \quad \nu_5 = 25.68$
$r_{10} = 1.4538$
$f = 1 \quad \Sigma_d = 2.7265 \quad t = 0.2823 \quad n_t = 1.51633$
$f_1/f = 3.897 \quad f_{12}/f = -7.093$
$f_{34}/f = 0.861 \quad WD' = 0.609 \quad NA = 0.53$

Embodiment 4

$r_1 = 2.9612$
$d_1 = 0.4150 \quad n_1 = 1.78472 \quad \nu_1 = 25.68$
$r_2 = 24.9438$
$d_2 = 0.4743$
$r_3 = -1.5381$
$d_3 = 0.4574 \quad n_2 = 1.74077 \quad \nu_2 = 27.79$
$r_4 = \infty$
$d_4 = 0.4800$
$r_5 = 30.3063$
$d_5 = 0.4574 \quad n_3 = 1.78472 \quad \nu_3 = 25.68$
$r_6 = -3.2943$
$d_6 = 0.0282$
$r_7 = 4.8709$
$d_7 = 0.4178 \quad n_4 = 1.883 \quad \nu_4 = 40.76$
$r_8 = -7.1083$
$d_8 = 0.0282$
$r_9 = 0.8523$
$d_9 = 0.4235 \quad n_5 = 1.883 \quad \nu_5 = 40.76$
$r_{10} = 1.7219$
$f = 1 \quad \Sigma_d = 3.1818 \quad t = 0.3388 \quad n_t = 1.51633$
$f_1/f = 4.352 \quad f_{12}/f = -6.207$
$f_{34}/f = 0.866 \quad WD' = 0.616 \quad NA = 0.6$

Embodiment 5

$r_1 = 2.1881$
$d_1 = 0.4835 \quad n_1 = 1.69680 \quad \nu_1 = 56.49$
$r_1' = -2.0298$
$d_1' = 0.1203 \quad n_1' = 1.78472 \quad \nu_1' = 25.68$
$r_2 = \infty$
$d_2 = 0.1491$
$r_3 = -1.6478$
$d_3 = 0.1203 \quad n_2 = 1.78472 \quad \nu_2 = 25.68$
$r_3' = 2.1054$
$d_3' = 0.3368 \quad n_2' = 1.497 \quad \nu_2' = 81.61$
$r_4 = \infty$
$d_4 = 0.1924$
$r_5 = 3.8410$
$d_5 = 0.4787 \quad n_3 = 1.497 \quad \nu_3 = 81.61$
$r_6 = -2.4535$
$d_6 = 0.0241$
$r_7 = 3.2305$
$d_7 = 0.4089 \quad n_4 = 1.7725 \quad \nu_4 = 49.66$
$r_8 = -5.3187$
$d_8 = 0.0241$
$r_9 = 0.842$
$d_9 = 0.4330 \quad n_5 = 1.7725 \quad \nu_5 = 49.66$
$r_{10} = 1.6841$
$f = 1 \quad \Sigma_d = 2.7712 \quad t = 0.3608 \quad n_t = 1.49388$
$f_1/f = 3.574 \quad f_{12}/f = -4.462$
$f_{34}/f = 0.846 \quad WD' = 0.584 \quad NA = 0.65$ In embodiments shown in the above, reference symbols $r_1$ through $r_{10}$ respectively represent radii of curvature of respective lens surfaces in the order from the light-source side, reference symbols $d_1$ through $d_9$ respectively represent thicknesses of respective lenses and airspaces between respective lenses in the order from the light-source side, reference symbols $n_1$ through $n_5$ respectively represent refractive indices of respective lenses in the order from the light-source side, reference symbols $\nu_1$ through $\nu_5$ respectively represent Abbe's numbers of respective lenses in the order from the light-source side, reference symbol t represents the thickness of the cover glass, reference symbol $n_t$ represents the refractive index of the cover glass, reference symbol WD' represents the working distance (distance from the lens surface nearest the disk side to the focal point on the disk side of the lens system), and reference symbol NA represents the numerical aperture on the disk side.

In respective embodiments shown in the above, the third lens component III is arranged to comprise two lens elements. By this arrangement, it is possible to make $f_{34}$ small and to make the working distance long by keeping the lens diameter small. Besides, when the third lens component is arranged to comprise two lens elements, surfaces of those lens elements which face each other are respectively arranged to have small radii of curvature. Because of this arrangement, the ray enters or goes out always at a small angle on respective surfaces, when the ray passes through the third lens component, and it is thereby arranged that aberrations to be caused at those surfaces become small in spite of strong powers of those surfaces. Furthermore, the third lens component having especially large positive power, out of lens components constituting the lens system, is arranged to have symmetrical shape as illustrated by respective embodiments and, at the same time, the stop is arranged just in front of the third lens component in order to make the lens diameter small. By the above-mentioned arrangement, coma becomes small and a very large field angle is obtained.

By arranging that the third lens component comprises two positive lens elements, it is possible to obtain a lens system which enables to attain the object of the present invention by using ordinary glass materials which are used widely and by adopting spherical surfaces only. However, it is also possible to obtain a lens system which enables to attain the object of the present invention even when the third lens component is arranged as a single lens by using glass material with high refractive index or by adopting an aspherical surface.

Out of embodiments shown in the above, Embodiments 1 and 2 are arranged that the surface on the disk side of the first lens component I and surface on the disk side of the second lens component II are planar surfaces and the airspace between the first and second lens components is small so that these lens components contact each other at their circumferential portions. By this arrangement, it is possible to center the second lens component by sliding it in respect to the first lens component and spacer ring to be arranged between the second and third lens components and, therefore, an intermediate tube is not required. As a result, the number of component parts becomes small and assembly and adjustment are simplified.

Embodiment 1 shows a lens system which is designed to make spherical aberration extremely small and coma very small, i.e., designed by laying emphasis on the quality of image to be obtained.

The lens system according to Embodiment 2 has N.A. equal to that of Embodiment 1 but its working distance is made considerably long (WD'=0.834) by making $f_{34}$ small, i.e., 0.908. Therefore, spherical aberration of this lens system is somewhat large. In other words, this lens system is designed by laying emphasis on the object to make the working distance long.

Embodiments 3 and 4 show lens systmes which are designed by making N.A. large. In cases of these lens systems, only the surface on the disk side of the second lens component is arranged as a planar surface because aberrations will become unfavourable when the surface on the disk side of the first lens component is arranged as a planar surface.

Out of these embodiments, Embodiment 3 has a large N.A., i.e., N.A.=0.53. Besides, to make the field angle wide, spherical aberration is made extremely small by favourably correcting coma at the same time. Furthermore, the working distance is made long, i.e., WD'=0.609 by making $f_{45}/f=0.861$.

Embodiment 4 is arranged to make N.A. still larger, i.e., N.A.=0.6. Moreover, the lens system according to Embodiment 4 has the imaging characteristic and working distance equivalent to those of Embodiment 3. To make spherical aberration and coma small, glass materials with higher refractive indices are used compared with the lens system according to Embodiment 3. In this case, to correct the above-mentioned aberrations in well-balanced state, it is necessary to keep a certain ratio between the refractive index of the lens constituting the second lens component and refractive indices of respective lenses constituting the third and fourth lens components.

Embodiment 5 shows an optical recording and read-out lens system for optical recording type disks to be used for both of recording and reading out.

As one of recording and read-out methods for optical recording type disks, there is such method to use two different wavelengths of light, one wavelength of light being used for control such as tracking and focusing and for reading out of signals and the other wavelength of light being used for recording of signals. In this method, such operations are performed that the recorded signals are read out just after recording, it is judged whether they are correct or not, and correction is made when an incorrect signal is found. Therefore, for the lens system to be used in this method, chromatic aberration should be corrected so that the focal length becomes the same for both of the two different wavelengths of light to be used. Moreover, that lens system should also have such features as small size, light weight, long working distance, high transmissivity, etc. which are required also for known lens systems for optically recorded disks.

Figure 3:
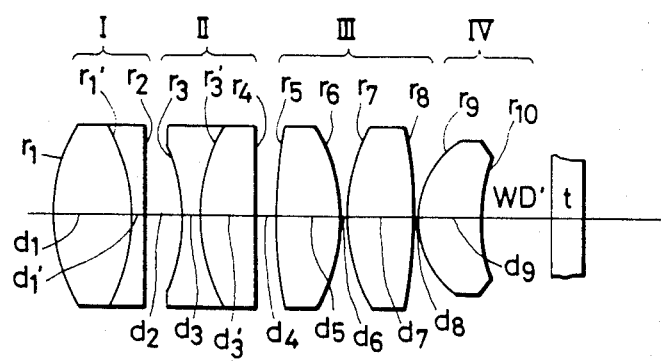
FIG. 3 shows a sectional view of Embodiment 5 of the present invention.
Figure 4:
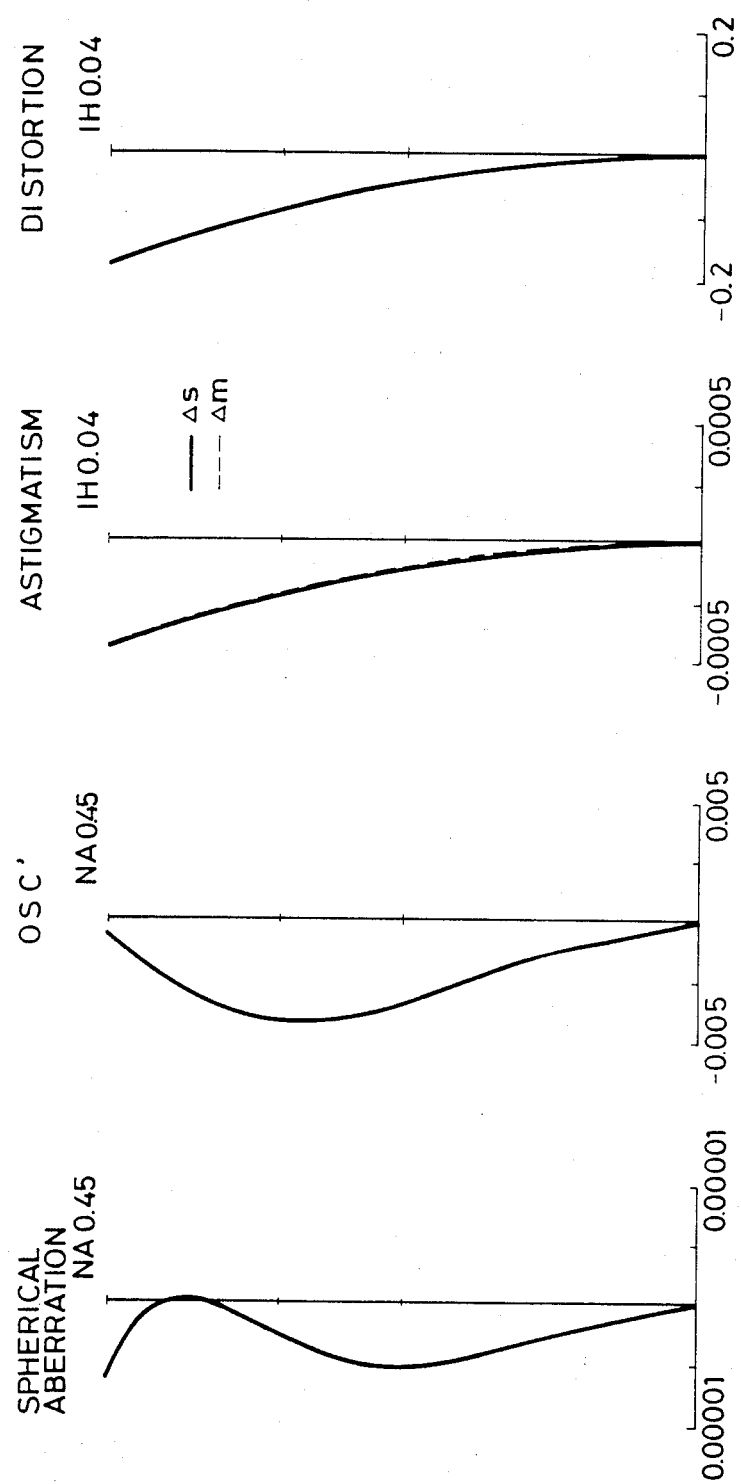
FIGS. 4 through 8 respectively show graphs illustrating aberration curves of Embodiments 1 through 5 of the present invention.
Figure 5:
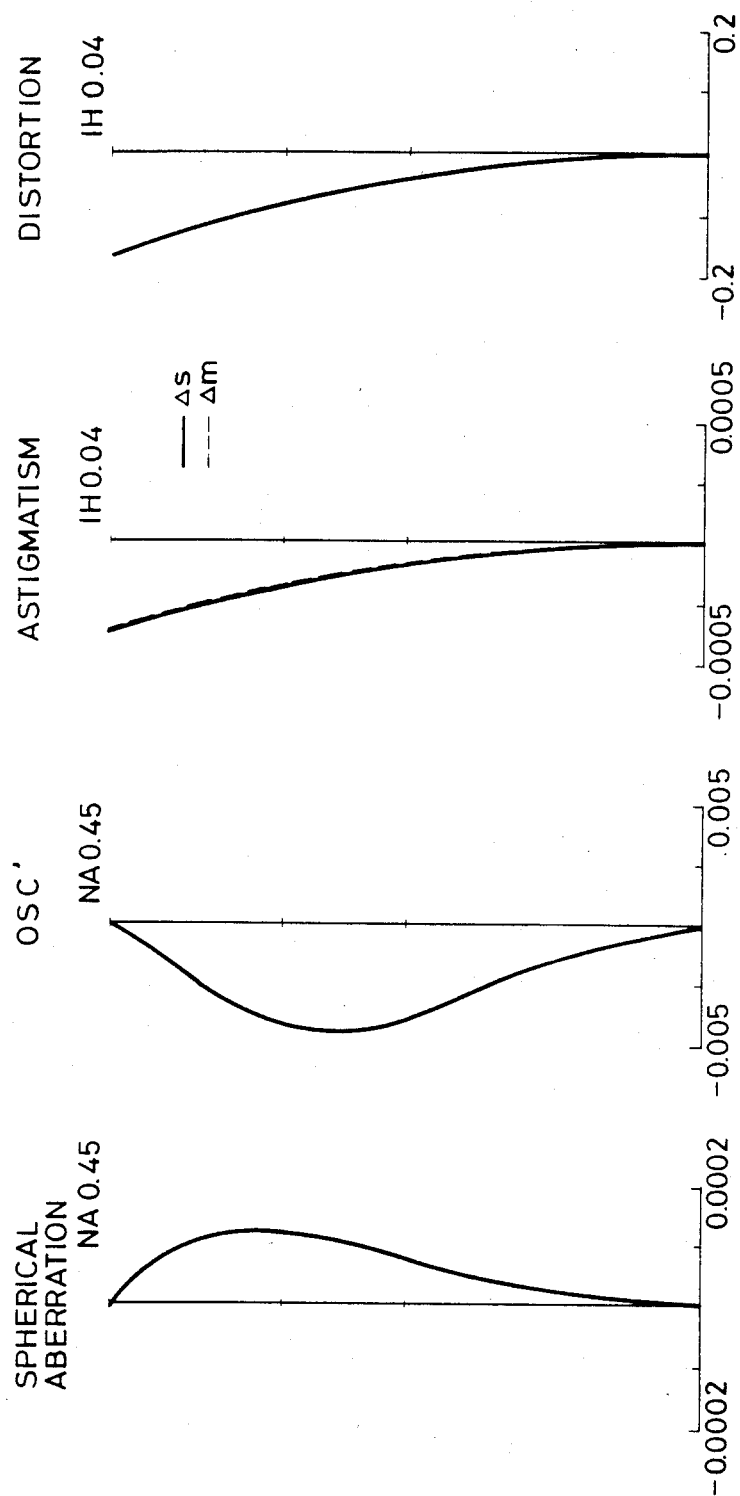
Figure 6:
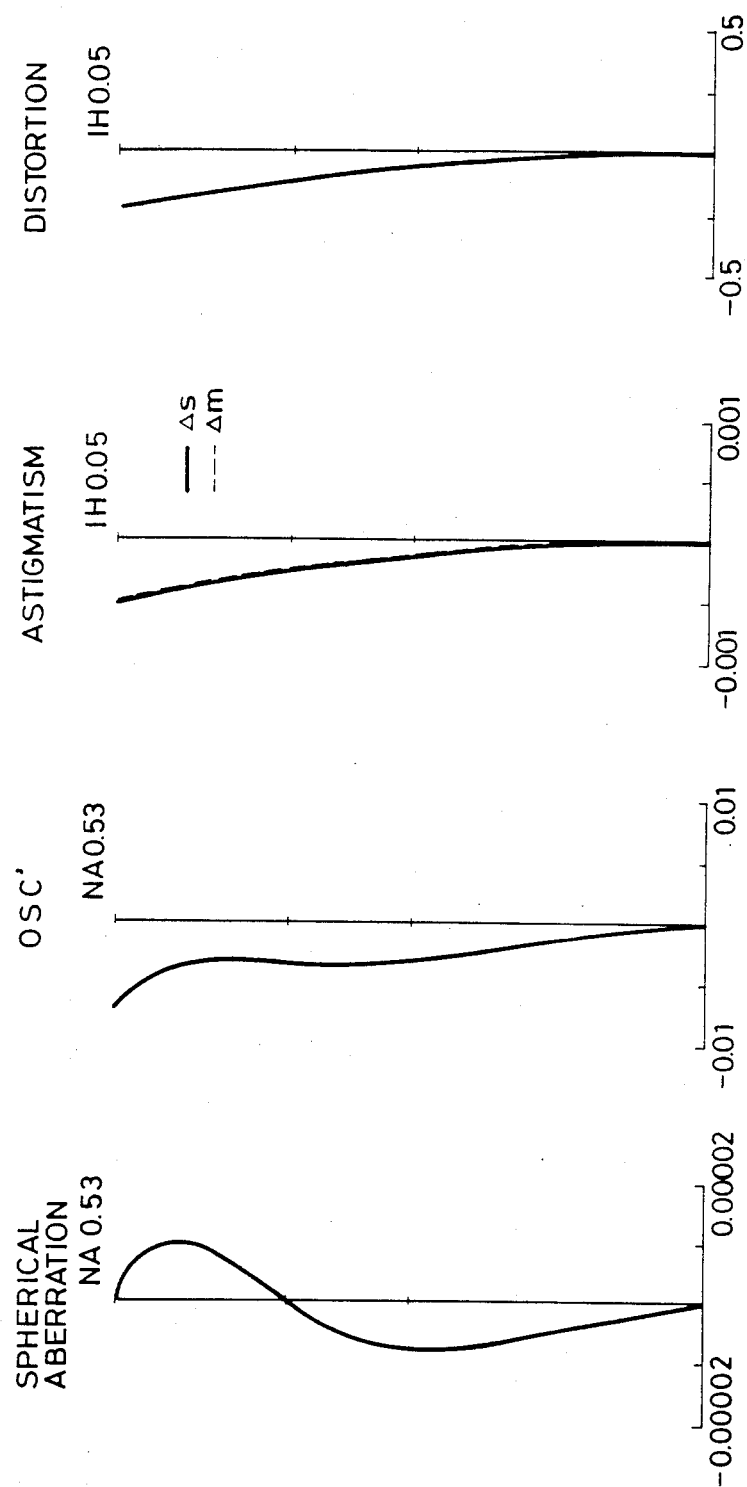
Figure 7:
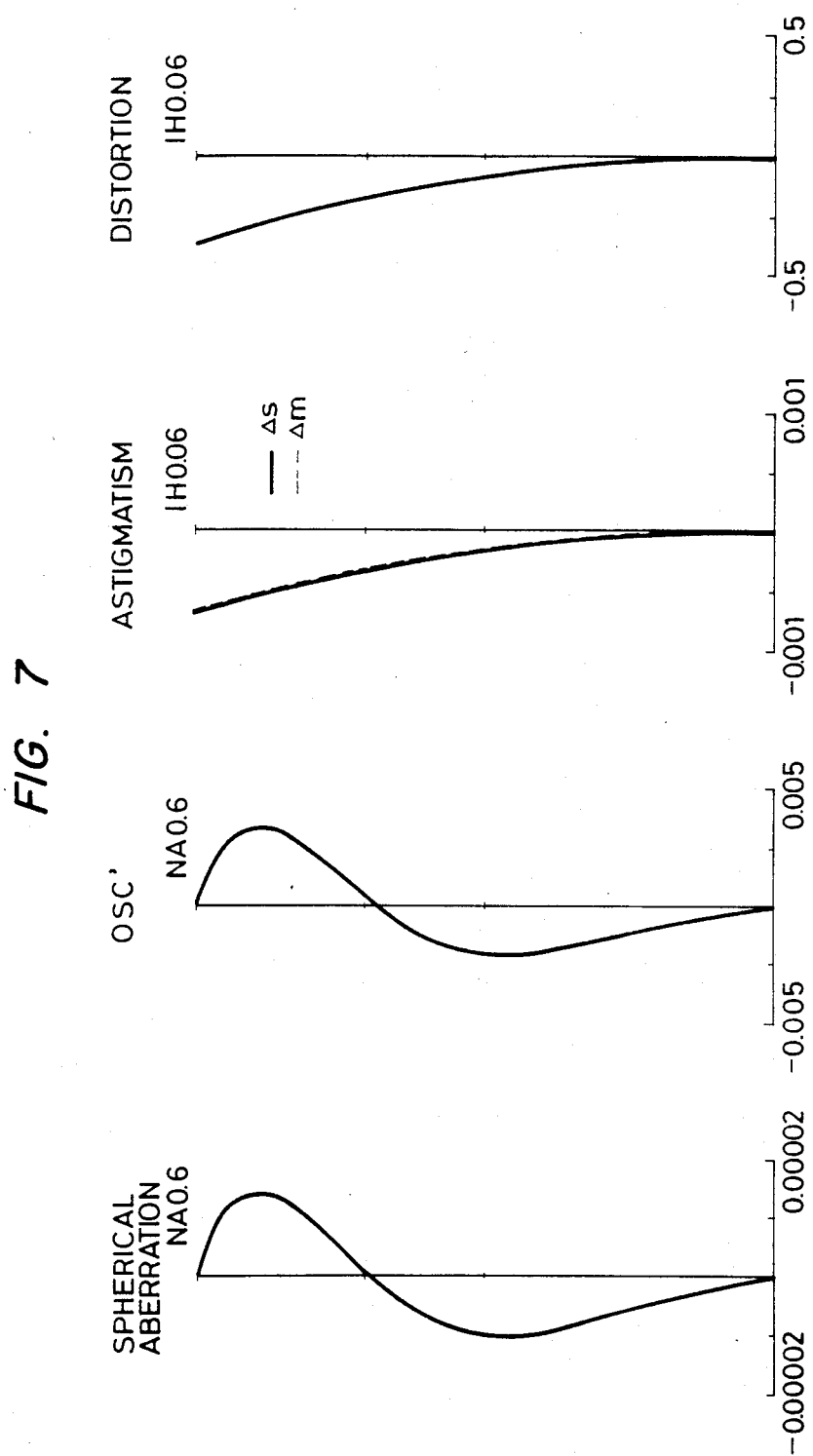
Figure 8:
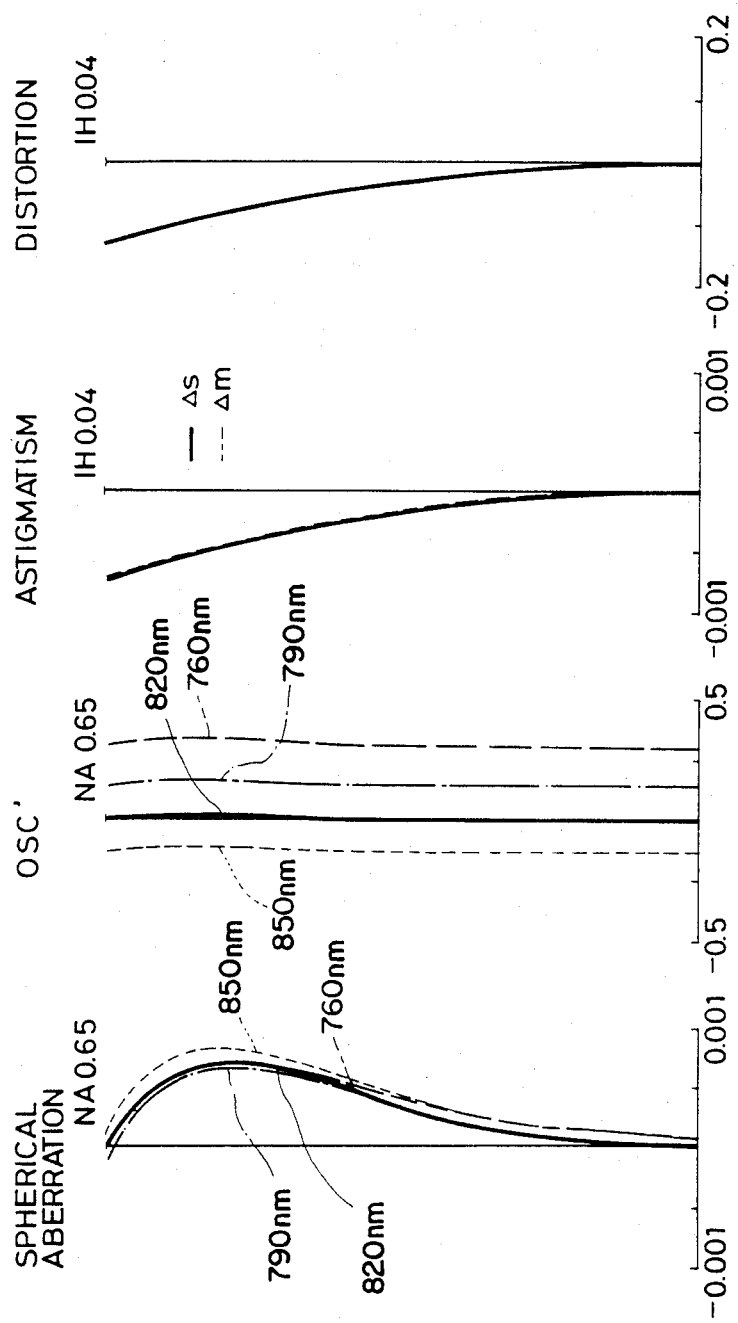

As a method for designing a lens system as described in the above, it may be considered to select a lens system having favourable imaging characteristic and large N.A., out of lens systems for optically recorded disks which are designed for monochromatic light, and to use that lens system by eliminating its chromatic aberration. The lens system according to Embodiment 5 is designed by adopting the above-mentioned method. That is, the lens system according to Embodiment 5 is obtained by favourably correcting chromatic aberration of a lens system, which is designed for monochromatic light, without increasing the number of lenses constituting the lens system and this lens system has lens configuration as shown in FIG. 3.

To eliminate paraxial chromatic aberration, it is effective when the lens components where the heights of ray which passes them are high are arranged to be achromatic. In the lens system according to the present invention, the first lens component I and the third lens component III correspond to such lens components.

On the other hand, to eliminate offaxial chromatic aberration, it is effective when offaxial chromatic aberration is eliminated by the lens components which are located in positions distant from the stop. In the lens system according to the present invention, the first lens component I and the fourth lens component IV correspond to such lens components because the stop is arranged just in front of the third lens component III.

In Embodiment 5, the first lens component I is arranged as a cemented doublet due to the above-mentioned reasons. To correct chromatic aberration by arranging the first lens component as a cemented doublet, it is preferable to make Abbe's number of the concave lens in the cemented doublet ($\nu_1'$ of Embodiment 5) as small as possible, i.e., it is necessary to arrange as $\nu_1' < 35$. Besides, the refractive index of the convex lens in the cemented doublet ($n_1$ of Embodiment 5) should not be made too low and, therefore, it is necessary to arrange as $n_1 > 1.6$.

When N.A. is large as in case of the lens system according to Embodiment 5, spherical aberration occurs if the radius of curvature of the surface on the light-source side of the first lens component is made too small. Therefore, the refractive index of the glass material of the convex lens in the first lens component should be higher than a certain value. This means that Abbe's number of the convex lens in the first lens component cannot be made so large. Consequently, it is impossible to correct chromatic aberration satisfactorily even when only the first lens component is arranged as a cemented doublet.

As a result, it is necessary to arranged another lens component as a cemented doublet. If, however, the fourth lens component IV is arranged as a cemented doublet, the fourth lens component becomes thick. If the thickness of the fourth lens component becomes large, the working distance short and this is not preferable. The third lens component III has the strongest positive power out of lens components constituting the lens system according to the present invention. Therefore, even when the third lens component is arranged as a cemented doublet, chromatic aberration cannot be corrected satisfactorily because strong negative power cannot be given to the concave lens in the cemented doublet.

In Embodiment 5 of the present invention, the second lens component II, which is the only one lens component having negative power out of lens components constituting the lens system, is arranged as a cemented doublet in order to correct chromatic aberration more favourably. To correct chromatic aberration by arranging the second lens component as a cemented doublet, Abbe's number $\nu_2$ of the concave lens in the cemented doublet should be made as small as possible, i.e., $\nu_2 < 35$. Besides, to make the diverging angles of rays at the cemented surface large, the refractive index $n_2'$ of the convex lens in the cemented doublet should be made low, i.e., $n_2 - n_2' > 0.2$.

In case of the lens system according to Embodiment 5, chromatic aberration is corrected very favourably by arranging the first and second lens components as cemented doublets as described in the above and, at the same time, by using glass materials with large Abbe's numbers for the third and fourth lens components. However, as glass materials with large Abbe's numbers generally have low refractive indices, aberrations other than chromatic aberration might become unfavourable. To solve this problem, for the third and fourth lens components in Embodiment 5, glass materials with as far as possible large Abbe's numbers are used within the range where the refractive indices do not become too low to cause aggravation to the other aberrations.

The lens system according to Embodiment 5 has a large N.A., i.e., 0.65, and at the same time, long working distance, i.e., 0.584. Besides, it is so arranged that the first and second lens components contact each other at their circumferential portions in the same way as Embodiments 1 and 2. Therefore, at the time of assembly, centering adjustment can be made by sliding the second lens component in respect to the first lens component. Consequently, an intermediate tube is not required.

In case of a lens system in which the total refractive power of the first and second lens components is negative and total refractive power of the third and fourth lens components is positive like the lens system according to the present invention, it is possible to obtain a lens system, which has a long working distance and enables to correct aberrations comparatively easily, when the distance from the total rear principal point of the first and second lens components to the total rear principal point of the third and fourth lens components is made large and the total rear principal point of third and fourth lens components is thereby shifted toward the disk side.

In the lens system according to Embodiment 5, both of the total front principal point and total rear principal point of the third and fourth lens components are shifted toward the disk side by reducing the refractive index of the lens element on the light-source side in the third lens component so that the lens system has long working distance and well corrected aberrations. Besides, by the above-mentioned arrangement, it becomes possible to use glass material with large Abbe's number for the lens element on the light-source side in the third lens component and, consequently, correction of chromatic aberration becomes easy.

Besides, when N.A. may be made somewhat small, it is possible to correct chromatic aberration favourably even when the second lens component is arranged as a single lens by using glass material with large Abbe's number for the convex lens in the first lens component or when the third lens component is arranged as a cemented lens consisting of three lens elements.

As described so far based on respective embodiments, the present invention provides an excellent lens system for optically recorded disks having a large N.A., long working distance and wide field angle which are required for lens systems for optically recorded disks.

I claim:

1. A lens system for optically recorded disks comprising first, second, third and fourth lens components in the order from the light-source side wherein said first lens component has positive refractive power, said second lens component has negative refractive power, said third lens component has positive refractive power and consists of two positive lenses, and said fourth lens component has a concave surface on the disk side and has positive refractive power, said lens system for optically recorded disks being arranged to fulfill the following conditions:

(1) $0 < r_1 < |r_2|$ (2) $r_3 < 0$, $|r_3| < |r_4|$ (3) $f_1/f > 0$ (4) $f_{12}/f < 0$ (5) $0.6 < f_{34}/f < 1$ wherein reference symbols $r_1$ and $r_2$ respectively represent radii of curvature of the surface on the light-source side and surface on the disk side of the first lens component, reference symbols $r_3$ and $r_4$ respectively represent radii of curvature of the surface on the light-source side and surface on the disk side of the second lens component, reference symbol $f$ represents the focal length of the lens system as a whole, reference symbol $f_1$ represents the focal length of the first lens component, reference sumbol $f_{12}$ represents the total focal length of the first and second lens components, and reference symbol $f_{34}$ represents the focal length of the third and fourth lens components.

2. A lens system for optically recorded disks according to claim 1 wherein said second lens component is arranged that the surface on the disk side thereof is formed as a planar surface.

3. A lens system for optically recorded disks according to claim 2, in which said lens system for optically recorded disks has the following numerical data:

| | | |
|---|---|---|
| $r_1 = 2.6286$ | | |
| $d_1 = 0.3458$ | $n_1 = 1.78472$ | $\nu_1 = 25.68$ |
| $r_2 = 20.7836$ | | |
| $d_2 = 0.3834$ | | |
| $r_3 = -1.4538$ | | |
| $d_3 = 0.3811$ | $n_2 = 1.69895$ | $\nu_2 = 30.12$ |
| $r_4 = \infty$ | | |
| $d_4 = 0.3952$ | | |
| $r_5 = 21.095$ | | |
| $d_5 = 0.3811$ | $n_3 = 1.78472$ | $\nu_3 = 25.68$ |
| $r_6 = -3.227$ | | |
| $d_6 = 0.1153$ | | |
| $r_7 = 4.1541$ | | |
| $d_7 = 0.3482$ | $n_4 = 1.78472$ | $\nu_4 = 25.68$ |
| $r_8 = -4.3971$ | | |
| $d_8 = 0.0235$ | | |
| $r_9 = 0.7652$ | | |
| $d_9 = 0.3529$ | $n_5 = 1.78472$ | $\nu_5 = 25.68$ |
| $r_{10} = 1.4538$ | | |
| $f = 1$ $f_1/f = 3.897$ $f_{12}/f = -7.093$ | | |
| $f_{34}/f = 0.861$ WD' $= 0.609$ NA $= 0.53$ | | | wherein reference symbols $r_1$ through $r_{10}$ respectively represent radii of curvature of respective lens surfaces in the order from the light-source side, reference symbols $d_1$ through $d_9$ respectively represent thicknesses of respective lenses and airspaces between respective lenses in the order from the light-source side, reference symbols $n_1$ through $n_5$ respectively represent refractive indices of respective lenses in the order from the light-source side, reference symbols $\nu_1$ through $\nu_5$ respectively represent Abbe's numbers of respective lenses in the order from the light-source side, reference symbol WD' represents the working distance, and reference symbol NA represents the numerical aperture on the disk side.

4. A lens system for optically recorded disks according to claim 2, in which said lens system for optically recorded disks has the following numerical data:

| | | |
|---|---|---|
| $r_1 = 2.9612$ | | |
| $d_1 = 0.4150$ | $n_1 = 1.78472$ | $\nu_1 = 25.68$ |
| $r_2 = 24.9438$ | | |
| $d_2 = 0.4743$ | | |
| $r_3 = -1.5381$ | | |
| $d_3 = 0.4574$ | $n_2 = 1.74077$ | $\nu_2 = 27.79$ |
| $r_4 = \infty$ | | |
| $d_4 = 0.4800$ | | |
| $r_5 = 30.3063$ | | |
| $d_5 = 0.4574$ | $n_3 = 1.78472$ | $\nu_3 = 25.68$ |
| $r_6 = -3.2943$ | | |
| $d_6 = 0.0282$ | | |
| $r_7 = 4.8709$ | | |
| $d_7 = 0.4178$ | $n_4 = 1.883$ | $\nu_4 = 40.76$ |
| $r_8 = -7.1083$ | | |
| $d_8 = 0.0282$ | | |
| $r_9 = 0.8523$ | | |
| $d_9 = 0.4235$ | $n_5 = 1.883$ | $\nu_5 = 40.76$ |
| $r_{10} = 1.7219$ | | |
| $f = 1$ $f_1/f = 4.352$ $f_{12}/f = -6.207$ | | |
| $f_{34}/f = 0.866$ WD' $= 0.616$ NA $= 0.6$ | | | wherein reference symbols $r_1$ through $r_{10}$ respectively represent radii of curvature of respective lens surfaces in the order from the light-source side, reference symbols $d_1$ through $d_9$ respectively represent thicknesses of respective lenses and airspaces between respective lenses in the order from the light-source side, reference symbols $n_1$ through $n_5$ respectively represent refractive indices of respective lenses in the order from the light-source side, reference symbols $\nu_1$ through $\nu_5$ respectively represent Abbe's numbers of respective lenses in the order from the light-source side, reference symbol WD' represents the working distance, and reference symbol NA represents the numerical aperture on the disk side.

5. A lens system for optically recorded disks according to claim 2 wherein said first lens component is arranged that the surface on the disk side thereof is formed as a planar surface.

6. A lens system for optically recorded disks according to claim 5, in which said lens system for optically recorded disks has the following numerical data:

| | | |
|---|---|---|
| $r_1 = 2.1555$ | | |
| $d_1 = 0.3066$ | $n_1 = 1.58144$ | $\nu_1 = 40.75$ |
| $r_2 = \infty$ | | |
| $d_2 = 0.1089$ | | |
| $r_3 = -1.3455$ | | |
| $d_3 = 0.3377$ | $n_2 = 1.78472$ | $\nu_2 = 25.68$ |
| $r_4 = \infty$ | | |
| $d_4 = 0.3844$ | | |
| $r_5 = -17.5732$ | | |
| $d_5 = 0.3733$ | $n_3 = 1.58144$ | $\nu_3 = 40.75$ |
| $r_6 = -1.6925$ | | |
| $d_6 = 0.1089$ | | |
| $r_7 = 2.3819$ | | |
| $d_7 = 0.3244$ | $n_4 = 1.78472$ | $\nu_4 = 25.68$ |
| $r_8 = -13.8125$ | | |
| $d_8 = 0.0222$ | | |
| $r_9 = 0.9058$ | | |
| $d_9 = 0.3266$ | $n_5 = 1.78472$ | $\nu_5 = 25.68$ |
| $r_{10} = 1.5441$ | | |
| $f = 1$ $f_1/f = 3.767$ $f_{12}/f = -3.878$ | | |
| $f_{34}/f = 0.916$ WD' $= 0.776$ NA $= 0.45$ | | | wherein reference symbols $r_1$ through $r_{10}$ respectively represent radii of curvature of respective lens surfaces in the order from the light-source side, reference symbols $d_1$ through $d_9$ respectively represent thicknesses of respective lenses and airspaces between respective lenses in the order from the light-source side, reference symbols $n_1$ through $n_5$ respectively represent refractive indices of respective lenses in the order from the light-source side, reference symbols $\nu_1$ through $\nu_5$ respectively represent Abbe's numbers of respective lenses in the order from the light-source side, reference symbol WD' represents the working distance, and reference symbol NA represents the numerical aperture on the disk side.

7. A lens system for optically recorded disks according to claim 5, in which said lens system for optically recorded disks has the following numerical data:

| | | |
|---|---|---|
| $r_1 = 2.3949$ | | |
| $d_1 = 0.3067$ | $n_1 = 1.58144$ | $\nu_1 = 40.75$ |
| $r_2 = \infty$ | | |
| $d_2 = 0.1089$ | | |
| $r_3 = -1.1944$ | | |
| $d_3 = 0.3378$ | $n_2 = 1.78472$ | $\nu_2 = 25.68$ |
| $r_4 = \infty$ | | |
| $d_4 = 0.3844$ | | |
| $r_5 = -25.3218$ | | |
| $d_5 = 0.3733$ | $n_3 = 1.78472$ | $\nu_3 = 25.68$ |
| $r_6 = -1.7840$ | | |
| $d_6 = 0.1089$ | | |
| $r_7 = 2.5657$ | | |
| $d_7 = 0.3244$ | $n_4 = 1.78472$ | $\nu_4 = 25.68$ |
| $r_8 = -17.9823$ | | |
| $d_8 = 0.0222$ | | |
| $r_9 = 0.9433$ | | |
| $d_9 = 0.3267$ | $n_5 = 1.78472$ | $\nu_5 = 25.68$ |
| $r_{10} = 1.4895$ | | |
| $f = 1 \quad f_1/f = 4.186 \quad f_{12}/f = -2.811$ | | |
| $f_{34}/f = 0.908 \quad WD' = 0.834 \quad NA = 0.45$ | | | wherein reference symbols $r_1$ through $r_{10}$ respectively represent radii of curvature of respective lens surfaces in the order from the light-source side, reference symbols $d_1$ through $d_9$ respectively represent thicknesses of respective lenses and airspaces between respective lenses in the order from the light-source side, reference symbols $n_1$ through $n_5$ respectively represent refractive indices of respective lenses in the order from the light-source side, reference symbols $\nu_1$ through $\nu_5$ respectively represent Abbe's numbers of respective lenses in the order from the light-source side, reference symbol WD' represents the working distance, and reference symbol NA represents the numerical aperture on the disk side.

8. A lens system for optically recorded disks according to claim 1, wherein both of said first lens component and said second lens component are respectively arranged as cemented doublets, said lens system for optically recorded disks being arranged to further fulfill the following conditions:

$\nu_1' < 35, \quad n_1 > 1.6$ $\nu_2 < 35, \quad n_2 - n_2' > 0.2$ wherein reference symbol $n_1$ represents the refractive index of the lens element on the light-source side in the first lens component, reference symbols $n_2$ and $n_2'$ respectively represent refractive indices of the lens elements on the light-source side and disk side in the second lens component, reference symbol $\nu_1'$ represents Abbe's number of the lens element on the disk side in the first lens component, and reference symbol $\nu_2$ represents Abbe's number of the lens element on the light-source side in the second lens component.

9. A lens system for optically recorded disks according to claim 2, wherein both of said first lens component and said second lens component are respectively arranged as cemented doublets, said lens system for optically recorded disks being arranged to further fulfill the following conditions:

$\nu_1' < 35, \quad n_1 > 1.6$ $\nu_2 < 35, \quad n_2 - n_2' > 0.2$ wherein reference symbol $n_1$ represents the refractive index of the lens element on the light-source side in the first lens component, reference symbols $n_2$ and $n_2'$ respectively represent refractive indices of the lens elements on the light-source side and disk side in the second lens component, reference symbol $\nu_1'$ represents Abbe's number of the lens element on the disk side in the first lens component, and reference symbol $\nu_2$ represents Abbe's number of the lens element on the light-source side in the second lens component.

10. A lens system for optically recorded disks according to claim 8, in which lens system for optically recorded disks has the following numerical data:

| | | |
|---|---|---|
| $r_1 = 2.1881$ | | |
| $d_1 = 0.4835$ | $n_1 = 1.69680$ | $\nu_1 = 56.49$ |
| $r_1' = -2.0298$ | | |
| $d_1' = 0.1203$ | $n_1' = 1.78472$ | $\nu_1' = 25.68$ |
| $r_2 = \infty$ | | |
| $d_2 = 0.1491$ | | |
| $r_3 = -1.6478$ | | |
| $d_3 = 0.1203$ | $n_2 = 1.78472$ | $\nu_2 = 25.68$ |
| $r_3' = 2.1054$ | | |
| $d_3' = 0.3368$ | $n_2' = 1.497$ | $\nu_2' = 81.61$ |
| $r_4 = \infty$ | | |
| $d_4 = 0.1924$ | | |
| $r_5 = 3.8410$ | | |
| $d_5 = 0.4787$ | $n_3 = 1.497$ | $\nu_3 = 81.61$ |
| $r_6 = -2.4535$ | | |
| $d_6 = 0.0241$ | | |
| $r_7 = 3.2305$ | | |
| $d_7 = 0.4089$ | $n_4 = 1.7725$ | $\nu_4 = 49.66$ |
| $r_8 = -5.3187$ | | |
| $d_8 = 0.0241$ | | |
| $r_9 = 0.842$ | | |
| $d_9 = 0.4330$ | $n_5 = 1.7725$ | $\nu_5 = 49.66$ |
| $r_{10} = 1.6841$ | | |
| $f = 1 \quad f_1/f = 3.574 \quad f_{12}/f = -4.462$ | | |
| $f_{34}/f = 0.846 \quad WD' = 0.584 \quad NA = 0.65$ | | | wherein reference symbols $r_1$ through $r_{10}$ respectively represent radii of curvature of respective lens surfaces in the order from the light-source side, reference symbols $d_1$ through $d_9$ respectively represent thicknesses of respective lenses and airspaces between respective lenses in the order from the light-source side, reference symbols $n_1$ through $n_5$ respectively represent refractive indices of respective lenses in the order from the light-source side, reference symbols $\nu_1$ through $\nu_5$ respectively represent Abbe's numbers of respective lenses in the order from the light-source side, reference symbol WD' represents the working distance, and reference symbol NA represents the numerical aperture on the disk side.

* * * * *